United States Patent [19]

La Bate

[11] 4,116,709
[45] Sep. 26, 1978

[54] PATCH MATERIAL FOR CHUCK HOLES IN PAVEMENT

[76] Inventor: Michael Donald La Bate, 115 Hazen Ave., Ellwood City, Pa. 16117

[21] Appl. No.: 738,617

[22] Filed: Nov. 3, 1976

[51] Int. Cl.² .................. C08L 95/00; C09D 3/24
[52] U.S. Cl. .................................. 106/284; 106/55; 106/65
[58] Field of Search ............ 106/284, 280, 281, 282, 106/38.8; 404/19, 20, 75

[56] References Cited

U.S. PATENT DOCUMENTS

| 289,939 | 12/1883 | Stickle | 106/284 |
|---|---|---|---|
| 392,614 | 11/1888 | Lee | 106/280 |
| 443,953 | 12/1890 | Benjamin | 106/281 R |
| 1,197,626 | 9/1916 | Hershman | 106/281 X |
| 2,013,625 | 9/1935 | Buck | 106/56 |
| 2,252,991 | 8/1941 | Steck | 106/282 X |
| 2,488,252 | 11/1949 | Wood | 106/281 R X |
| 2,886,459 | 5/1959 | Lajoie | 106/282 |

*Primary Examiner*—Joan E. Welcome
*Attorney, Agent, or Firm*—Webster B. Harpman

[57] ABSTRACT

A patch material for filling and sealing chuck holes in pavements comprises iron scale and aluminum particles, ground ceramic brick and/or blast furnace slag and pitch, the iron scale and aluminum particles producing metal when ignited and suitable temperatures to form a molten liquid containing the other materials.

5 Claims, No Drawings

PATCH MATERIAL FOR CHUCK HOLES IN PAVEMENT

BACKGROUND OF THE INVENTION (1) Field of the Invention:

This invention relates to patching materials for chuck holes in pavements and the like.

(2) Description of the Prior Art:

No prior art is known wherein a mixture of materials including exothermic materials produces a molten slag-like liquid suitable when cooled to form a durable and bonded patch in a chuck hole.

Prior patching compositions have used mixtures of aggregate and bitumem and/or Portland cement as for example in U.S. Pat. No. 1,230,894 wherein a flammable liquid placed in the chuck hole in a bituminous pavement and ignited, heats it sufficiently to theoretically bond a bituminous material patch positioned therein.

This invention utilizes such materials as ground ceramic brick, blast furnace slag and metal producing exothermic materials including aluminum particles and iron scale to create a molten liquid in the chuck hole which rapidly cools upon the end of the reaction of the exothermic material to form a desirable bonded patch.

SUMMARY OF THE INVENTION

A patch material for chuck holes in pavement utilizes ground ceramic brick, blast furnace slag and/or other refractories and an exothermic metal producing material such as theremite in a mixture wherein the quantity of exothermic material is sufficient to generate temperatures reducing some of the exothermic materials to a molten liquid containing the refractories and disposed in a chuck hole to be filled. Upon cooling the molten liquid forms an integral thoroughly bonded durable patch in the chuck hole.

DESCRIPTION OF THE PREFERRED EMBODIMENT

In its disclosed form the patch material for chuck holes in pavement consists of a dry mixture of ground ceramic brick, blast furnace slag, clay or a similar refractory material, pitch and exothermic materials such as finely divided metallic aluminum and one or more oxides, as of iron, in a quantity sufficient to produce when ignited an extremely high temperature as the result of the union of the aluminum with the oxygen of the oxide so as to reduce some of the aluminum and iron oxide to a molten liquid. A typical batch of the patch material would comprise between about 20% and 25% ground ceramic brick or blast furnace slag, between about 10% and 20% pitch and exothermic materials comprising between about 10% and 18% aluminum particles and between about 37% to 60% iron scale and may be conveniently positioned in a chuck hole to be filled in a pavement and ignited by the creation of ignition temperatures in the iron scale and aluminum particles (thermite) as will occur to those skilled in the art. Alternately the ground ceramic brick or blast furnace slag or other refractory materials employed may be separated from the exothermic materials and a desirable quantity of the exothermic materials added thereto in the chuck hole and ignited in concentrated form. In either event, the resulting high temperatures from the result of the union of the aluminum with the oxygen of the oxide in the iron scale, produces sufficient temperature for a sufficient time to liquify the metals and the blast furnace slag and suspend the ground brick or other refractory material in the liquid metal and pitch and thereby form a suitable sealing and bonded patch in the pavement when cooled. Coal tar pitch or asphalt tar pitch may be used.

Those skilled in the art will observe that in patching a chuck hole in pavement some sections of reinforcing steel rod are preferably driven into the pavement in the chuck hole in a crisscross pattern, the patching material positioned therein and ignited. The patch material works equally well with black top bituminous asphaltic concrete and/or Portand cement concrete or in broken brick, cobblestone or other pavement. The molten mass of the patch material flows into intimate contact with the sides of the chuck hole and surrounds the steel rods and upon cooling forms a permanent patch secured in the chuck hole by this self-anchoring characteristic.

It will occur to those skilled in the art that the steel rods positioned in the chuck hole add metallics to the mixture which are heavier than the other components of the molten mass in the chuck hole so that the lighter material forms the upper portion of the patch and results in a non-brittle, eminently satisfactory patch in the pavement. The patch forms a smooth and unbroken area in the pavement occupying the former chuck hole.

In bituminous cement pavements the heat of the exothermic reaction softens and partially liquifies the bitumen in the asphaltic concrete which insures the sealing relation of the patch material in the chuck hole therein.

A typical batch of the patch material can comprise aluminum particles 10%, ground ceramic brick 20%, iron scale 60% and pitch 10%. It will be seen that this is a metal producing compound with the ground ceramic brick floating or contained upon solidification throughout the mass. The molten mass seeks its own level and bonds itself to the surrounding areas.

It will thus be seen that traffic may be immediately resumed after the solidification of the patch material disclosed herein.

The patch formed of the material disclosed herein as positioned in the chuck holes are able to resist the frost and freezing damage which usually results in the break up and loss of the patch materials heretofore used in patching chuck holes and the like.

Although but one embodiment of the present invention has been described, it will be apparent to those skilled in the art that various changes and modifications may be made without departing from the spirit of the invention and having thus described my invention what I claim is.

I claim:

1. A metal producing material for filling chuck holes in pavements consisting of a mixture comprising between about 10% and 20% pitch, between about 20% and 25% refractory particles, and exothermic materials which comprise between about 37% and 60% iron scale and between about 10% and 18% aluminum particles, the iron scale and aluminum particles being present in amounts sufficient to form an exothermic reaction when ignited to melt the iron in the scale and form a molten liquid which includes the refractory particles therein.

2. The patch material set forth in claim 1 and wherein the pitch comprises 10% of the mixture, the refractory scale comprise 20% of the mixture, the iron particles comprise 60% of the mixture and the aluminum particles comprise 10% of the mixture.

3. The patch material set forth in claim 1 and wherein the iron particles are iron scale.

4. The patch material set forth in claim 1 and wherein the refractory particles are ground ceramic brick.

5. The patch material set forth in claim 1 and wherein the refractory particles are blast furnace slag.

* * * * *